Figures 1, 2:
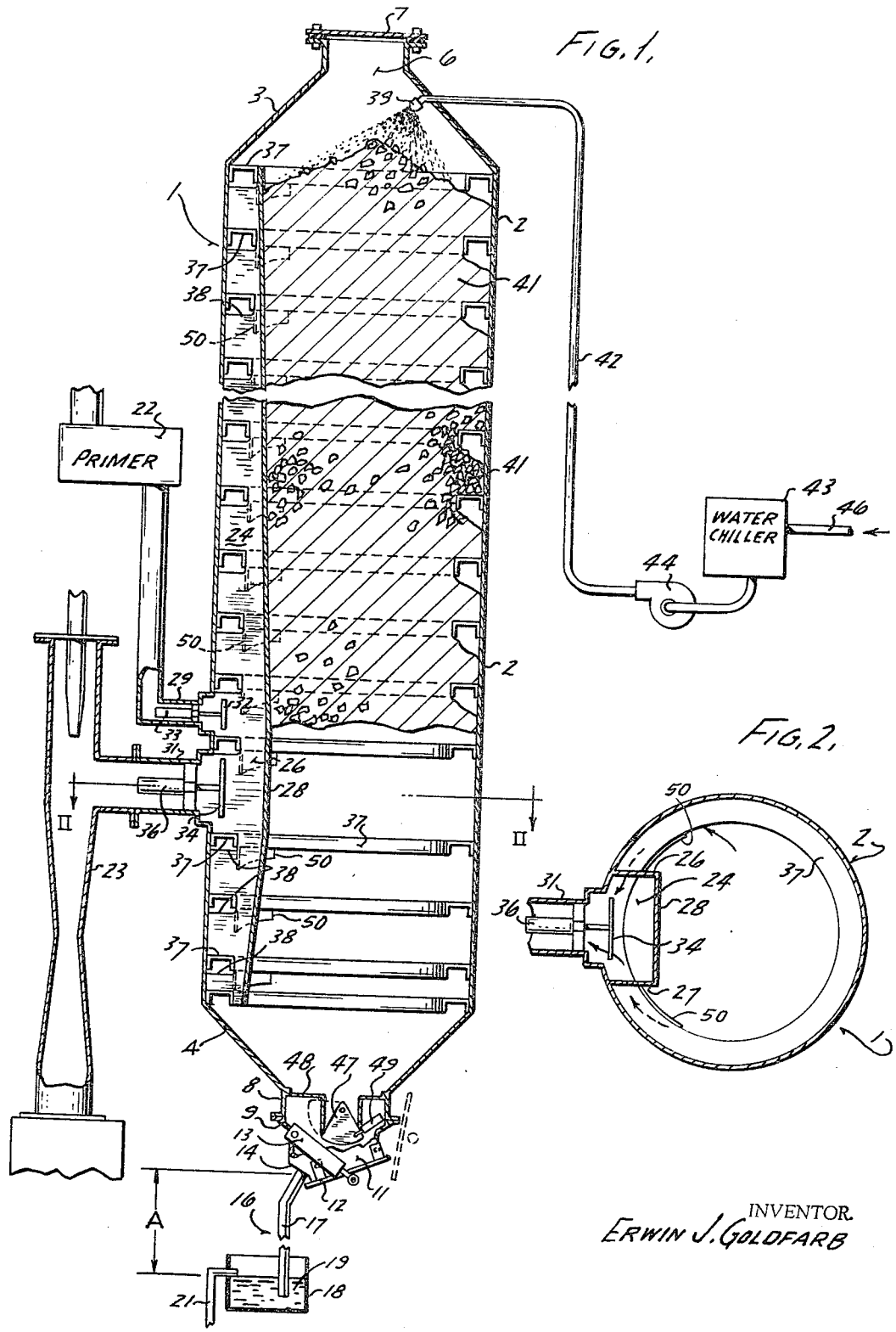

Oct. 11, 1966

E. J. GOLDFARB 3,277,664

APPARATUS FOR COOLING AGGREGATE FOR CONCRETE MIX

Filed March 2, 1965

INVENTOR.
*Erwin J. Goldfarb*

United States Patent Office 3,277,664
Patented Oct. 11, 1966

3,277,664
APPARATUS FOR COOLING AGGREGATE FOR CONCRETE MIX
Erwin J. Goldfarb, Champaign, Ill., assignor to Koehring Company, Milwaukee, Wis., a corporation of Wisconsin
Filed Mar. 2, 1965, Ser. No. 436,690
3 Claims. (Cl. 62—268)

The invention relates to the cooling and drying of granular material, and it is concerned more particularly with the preparation of cooled aggregate for a concrete mix.

Various methods and types of apparatus have heretofore been suggested for cooling ingredients of a concrete mix, particularly aggregate and sand, before they are mixed with the proper quantities of cement and water. The practice of pre-cooling the ingredients of a concrete mix is commonly employed for large construction projects such as the building of dams where large quantities of concrete mix are poured at a time. By pre-cooling the ingredients the temperature of the batch can be kept sufficiently low so that the heat which is generated by the curing of the cement will not raise the temperature of the poured mass beyond permissible limits.

In certain types of apparatus which have heretofore been suggested for the pre-cooling of concrete mix ingredients, a relatively large quantity of the ingredients is accumulated in a tank or silo, and cooling is effected by vacuum evaporation of moisture from the ingredients within the tank. However, these apparatus of the prior art have had short comings, particularly under the arduous operating conditions which are encountered on large scale construction projects and which involve the placement of huge masses of concrete for dams and the like.

On such projects the needed aggregate for the concrete mix varies in size from relatively small stones to large cobble. During the past it has been customary to cool a mixture of these different size aggregates, and in that case the aggregate mixture may retain enough water to permit the cooling process in which the vacuum is drawn and the water on the surface of the aggregate acts as the refrigerant as it evaporates. More recently, it has been found desirable to cool each size aggregate in a separate tank, and that has presented a problem as to the cooling of the large size cobbles for example. The water retained on the surface of the material in that case is likely to be insufficient to permit vacuum cooling to the desired temperature. Also, when the cooling plant is shut down, the vacuum tank will be resealed and the material recooled, if necessary, before being used. Here again, the lack of sufficient moisture may make it difficult to recool the aggregate to the required low temperature.

In order to effect sufficient heat removal from the granular materials by vacuum cooling an ample moisture supply must be provided. On the other hand, the prescribed water content of the mixed batch must be strictly maintained and it must not be upset by an over supply of water into the vacuum cooling tank.

The principal object of the present invention is to provide an improved vacuum type cooling apparatus for large size cobbles and other granular materials which are to be used as aggregate for a concerete mix and which require moistening in order to lower their temperature to a desired level by moisture evaporation in a vacuum.

More specifically, it is an object of the invention to provide an improved cooling apparatus of the mentioned character wherein any excess supply of moistening fluid to the cobbles or other granular materials in the vacuum tank is prevented from accumulating in the lower part of the vacuum tank and thus affecting the water content of the mixed concrete batch containing the cobbles or other granular materials.

A further object of the invention is to provide an improved vacuum type cooling apparatus of the above mentioned character wherein water for moistening the cobbles or other granular materials may be introduced into the vacuum tank before or during the evacuation of the latter, and wherein any non-evaporated excess water is automatically drained from the vacuum tank before an objectionable accumulation of excess water at the bottom of the tank can occur at any time before, during, or after the cooling cycle.

A still further object of the invention is to provide an improved vacuum type cooling apparatus of the above mentioned character wherein chilled water may be used to supply the cobbles or other granular materials with the required moisture for vacuum cooling.

A still further object of the invention is to provide an improved cooling apparatus of the hereinbefore outlined character which is extremely simple in construction, efficient in operation and which lends itself to manufacture at relatively low costs.

These and other objects and advantages are attained by the present invention various novel features of which will become apparent from the description herein and the accompanying drawing in which:

FIG. 1 is a sectional schematic side view of an aggregate cooling apparatus embodying the invention; and FIG. 2 is a sectional view on line II—II of FIG. 1.

The apparatus shown in FIG. 1 comprises an upright cooling tank 1 of suitably large size for cooling quantities of aggregate as needed for dam building and similar projects. A long cylindrical outer wall section 2 of the tank extends between generally conical top and bottom sections 3 and 4 which are secured thereto as by welding. The top section 3 or upper end of the tank presents a granular material inlet opening 6; and closure means in the form of a cover 7 which is operatively associated with the inlet opening 6 for selectively sealing and uncovering the latter in conventional manner.

The lower end of the tank 1 presents a granular material outlet opening 11 and, as will be described more fully hereinbelow, the lower end of the tank also presents a drain opening separate from the outlet opening 11. Closure means in the form of a cover 12 are operatively associated with the outlet opening 11 for selectively sealing and uncovering the latter independently of the drain opening.

The conical bottom section 4 of the tank terminates at its apex end in a neck 8, and flanged to the lower end of the neck 8 is a depending closure section 9 which presents the material outlet opening 11. Rockably mounted on the closure section 9 in conventional manner is the cover 12 which serves as a vacuum gate for sealing the outlet opening 11. The gate 12 is movable back and forth between a sealing position in which it is shown in full lines in FIG. 1, and an open position in which it is shown in dotted lines. An air ram 13 for moving the gate 12 to its sealing and open positions is pivotally mounted on the closure section 9 and has a reciprocable element connected in driving relation with the gate 12.

Generally, the construction, mounting and actuation of the vacuum gate 12 conform with conventional practice. It should be noted, however, that the gate 12 in its sealing position forms one side of a generally V-shaped cavity at the bottom of the closure section 9, the complementary side of said cavity being formed by a slanting wall portion 14 of the closure section 9. The cavity is closed at its near and far sides, as seen in FIG. 1, by depending wall portions of the closure section 9.

In operation of the apparatus, as will be explained more fully hereinbelow, water may gravitate into the closure section 9 at the bottom of the cooling tank. In order to prevent an undesirable accumulation of such water in the cavity presented by the closed vacuum gate 12 and the adjacent wall portions of the closure section 9 a barometric seal, generally designated by the reference character 16, is connected with a drain aperture in the slanting wall portion 14 near the lowest point of the cavity. The barometric seal comprises a tubular leg or pipe 17, a vented well or fluid reservoir 18, and a supply of sealing fluid 19, normally water, stored in the reservoir 18. An overflow pipe 21 is connected with the reservoir 18 at a distance above its bottom so that a predetermined amount of sealing fluid may accumulate within the reservoir and so that any excess fluid beyond said predetermined amount will be automatically drained from the reservoir. The open upper end of the pipe 17 is sealed, as by welding, in the drain aperture of the slanting wall portion 14, and the open lower end of the pipe 17 is immersed in the sealing fluid which is stored in the reservoir 18.

Exhaust pump means comprising a primer vacuum pump 22 and a steam jet vacuum booster pump 23 are connected with the tank 1 for producing therein a moisture evaporating vacuum and corresponding cooling effect in accordance with well known principles. A generally vertical exhaust duct 24 within the tank comprises a pair of elongated side walls 26 and 27 (FIG. 2) and a connecting wall 28. The side walls 26 and 27 extend in parallel, relatively spaced relation, along the inner surface of the cylindrical tank wall 2 to which they are secured as by welding. As shown in FIG. 1, the width of the side wall 26 is greatest along an intermediate portion within a lower part of the tank, and it tapers upwardly and downwardly from said intermediate portion towards the upper and lower ends of the cylindrical tank wall 2. The side wall 27 is similarly shaped, and the connecting wall 28 between the side walls 26 and 27 is bent to follow their contour, the inner edges of the side walls 26 and 27 being secured to the adjacent edges of the connecting wall 28, as by welding.

The internal exhaust duct 24 thus presents an enlarged intermediate portion in the lower part of the tank, and the primer pump 22 and booster pump 23 are connected to this enlarged intermediate portion of the duct 24 by suction lines 29 and 31, respectively. The connecting passage from the suction line 29 into the tank 1 is controlled by a priming valve 32 and associated air ram 33, and the connecting passage from the booster pump 23 into the tank is similarly controlled by a main valve 34 and associated air ram 36.

A series of channel iron rings 37 are mounted inside the tank 1 at vertical spacings from each other and are secured as by welding to the inner surface of the cylindrical tank wall 2. The open sides of the channel irons face downwardly, and each channel iron forms a complete circle intersecting the exhaust duct 24. Square openings 38 in the side wall 26 of the duct 24 and corresponding square openings in the opposite duct wall 27 accommodate the channel irons 38, baffle plates 50 are generally used to prevent material from coming into the duct 24. In this manner each channel iron 37 provides an annular vacuum duct in communication with the vertical exhaust duct 24.

At the upper end of the tank 1 a spray nozzle 39 is mounted on the inside of the conical top section 3 for spraying water upon a mass of aggregate 41 which has been accumulated within the tank. The nozzle is located to one side of the tank so as not to interfere with the loading of aggregate through the inlet opening 6. A supply line 42 for the spray nozzle 39 provides water which is sprayed upon the aggregate within the tank by the nozzle 39. A water chiller unit 43 may be used to precool the spray water, a pump 44 can provide the required water pressure, pipe 46 supplies the chiller unit.

At the lower end of the tank 1 a swingable inside gate 47 and associated shrouding 48 are mounted in the neck 8 of the conical bottom section 4. The gate 47 may be swung from the closed position in which it is shown in full lines to the open position in which it is shown in dotted lines by an air ram 49 which is mounted within the bottom section 4. In its closed position the gate 47 prevents passage of aggregate into the closure section 9, but it is not sufficiently close fitting to prevent the passage of water from the conical section 4 into the closure section 9.

An operating cycle of the apparatus shown in the drawings may be performed as follows. First, the swing gate 47 and the vacuum gate 12 are closed and the cover 7 is removed from the inlet opening 6. The tank is then filled with aggregate to be cooled which may be taken from a stock pile. Normally, the tank will be filled to capacity, as indicated in FIG. 1, and the top cover 7 is then secured in place thereby sealing the tank vacuum tight. Priming valve 22 is then opened and sufficient air is removed from the tank to reduce the absolute pressure in the tank down to the vapor pressure of the moisture in the tank. The main valve 34 is then opened and evacuation of the tank is continued until the temperature of the aggregate has been lowered to the desired level by moisture evaporation.

When the pressure within the tank is reduced below atmosphere by operation of the vacuum pump 22 atmospheric pressure acting upon the sealing fluid 19 in the reservoir 18 causes part of said liquid to flow up into the pipe 17. The sealing fluid continues to rise in the pipe 17 as evacuation of the tank continues by operation of the booster pump, and a state of equilibrium will be reached when the desired moisture evaporating vacuum in the tank has been established. The vertical distance between the fluid level in the reservoir 18 and the upper end of the pipe 17 which is indicated in FIG. 1 by the reference character A is such that the height to which the sealing fluid rises in the pipe 17 upon complete evacuation of the tank, will stay below the upper end of the pipe. Generally a height for the distance A of 36 feet or more is satisfactory if water is used as the sealing fluid.

The surface moisture of the aggregate as fed into the tank may not be sufficient to produce the desired temperature drop of the aggregate particles by evaporation of their surface moisture. Such a condition is apt to arise, for instance, if the aggregate consists mainly or entirely of relatively large particles, such as cobbles.

Also, a lack of adequate surface moisture may be incurred if a charge of aggregate has been cooled in the tank and it becomes necessary to re-cool the charge after a warm-up.

In order to correct any deficiency of adequate surface moisture of the aggregate, supplemental water may be fed into the tank through the pipe 42 and spray nozzle 39. It is not necessary that such supplemental water supply be carefully regulated. If it should be excessive, that is, if more water is fed into the tank than is evaporated to produce the desired cooling effect, the excess water gravitates over the aggregate and flows into the bottom cavity of the closure section 9 and from there into the upper end of the pipe 17. This will not affect the height of the column of sealing fluid in the pipe 17 since any amount of water entering at the top of the pipe will displace an equivalent amount of water in the reservoir 18 from which it will drain automatically through the overflow pipe 21.

The barometric seal 16 will be similarly effective if the aggregate as fed into the tank is excessively wet and the vacuum gate 12 is closed. In that case excess water may drain through the pipe 17 before the start of the cooling cycle and thus be prevented from falling on associated equipment such as batchers, hoppers or mixers. On the other hand, if the cooling cycle is started while the aggregate is still excessively wet only part of its surface moisture will evaporate during the cooling period and the excess water will gravitate into the bottom cavity of the tank and be automatically drained through the barometric seal.

In order to discharge the cooled aggregate from the tank the vacuum gate 12 and the inside gate 47 are opened. Since any excess water which may have gravitated into the bottom cavity of the tank has previously been drained automatically by operation of the barometric seal 16, the cooled discharged aggregate will be free from any uncontrolled water content which may upset the prescribed moisture content of the concrete mix in which such aggregate is used.

It should be understood that it is not intended to limit the invention to the herein disclosed form of apparatus and details of construction but that the invention includes such other forms and details as are embraced by the scope of the appended claims.

It is claimed and desired to be secured by Letters Patent:

1. Apparatus for cooling aggregate for a concrete mix comprising, an upright tank having an upper end presenting a granular material inlet opening, and a lower end presenting a granular material outlet opening and a drain opening separate from said outlet opening; closure means operatively associated with said inlet opening for selectively sealing and uncovering the latter; closure means operatively associated with said outlet opening for selectively sealing and uncovering the latter independently of said drain opening; exhaust pump means operatively connected with said tank for maintaining a moisture evaporating vacuum therein; a water spray device operatively mounted within said tank for delivering water upon an accumulated quantity of granular material within said tank; and barometric seal means operatively associated with said drain opening so as to prevent accumulation of excess water within said lower end of said tank while said outlet opening is sealed by its associated closure means.

2. Apparatus as set forth in claim 1 wherein said barometric seal comprises a vented fluid reservoir spaced vertically from the lower end of said tank, sealing fluid stored within said reservoir, and a pipe having an open lower end immersed in said sealing fluid and an open upper end connected in fluid receiving relation with the lower end of said tank.

3. Apparatus as set forth in claim 1 and further comprising a source of chilled water operatively connected in water delivering relation with said spray device.

References Cited by the Examiner

UNITED STATES PATENTS

| | | | |
|---|---|---|---|
| 2,634,591 | 4/1953 | Brardsley | 62—100 |
| 2,787,141 | 4/1957 | Julius | 62—100 |
| 3,108,448 | 10/1963 | Hightower | 62—100 |

WILLIAM J. WYE, *Primary Examiner.*